United States Patent Office 3,408,566
Patented Oct. 29, 1968

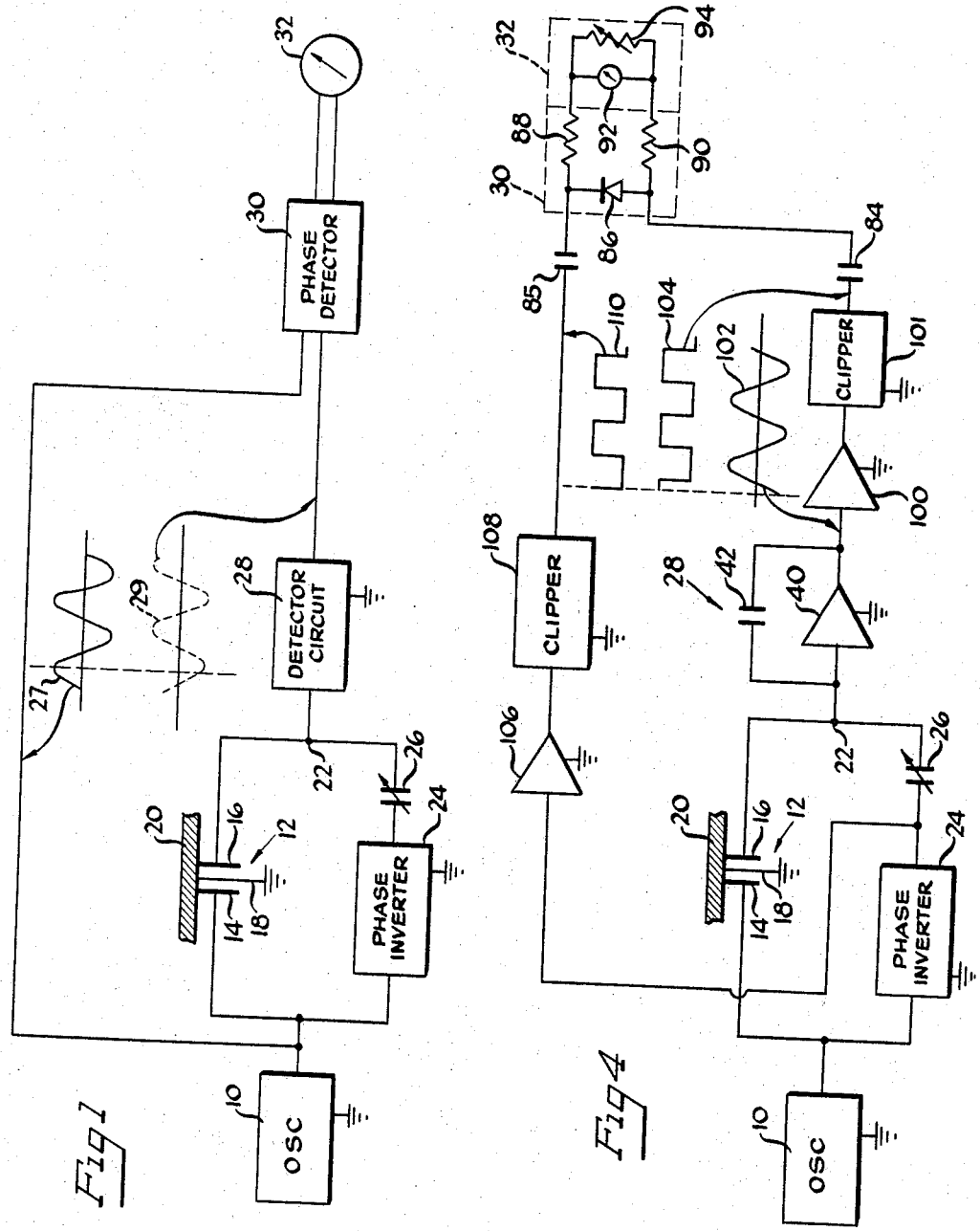

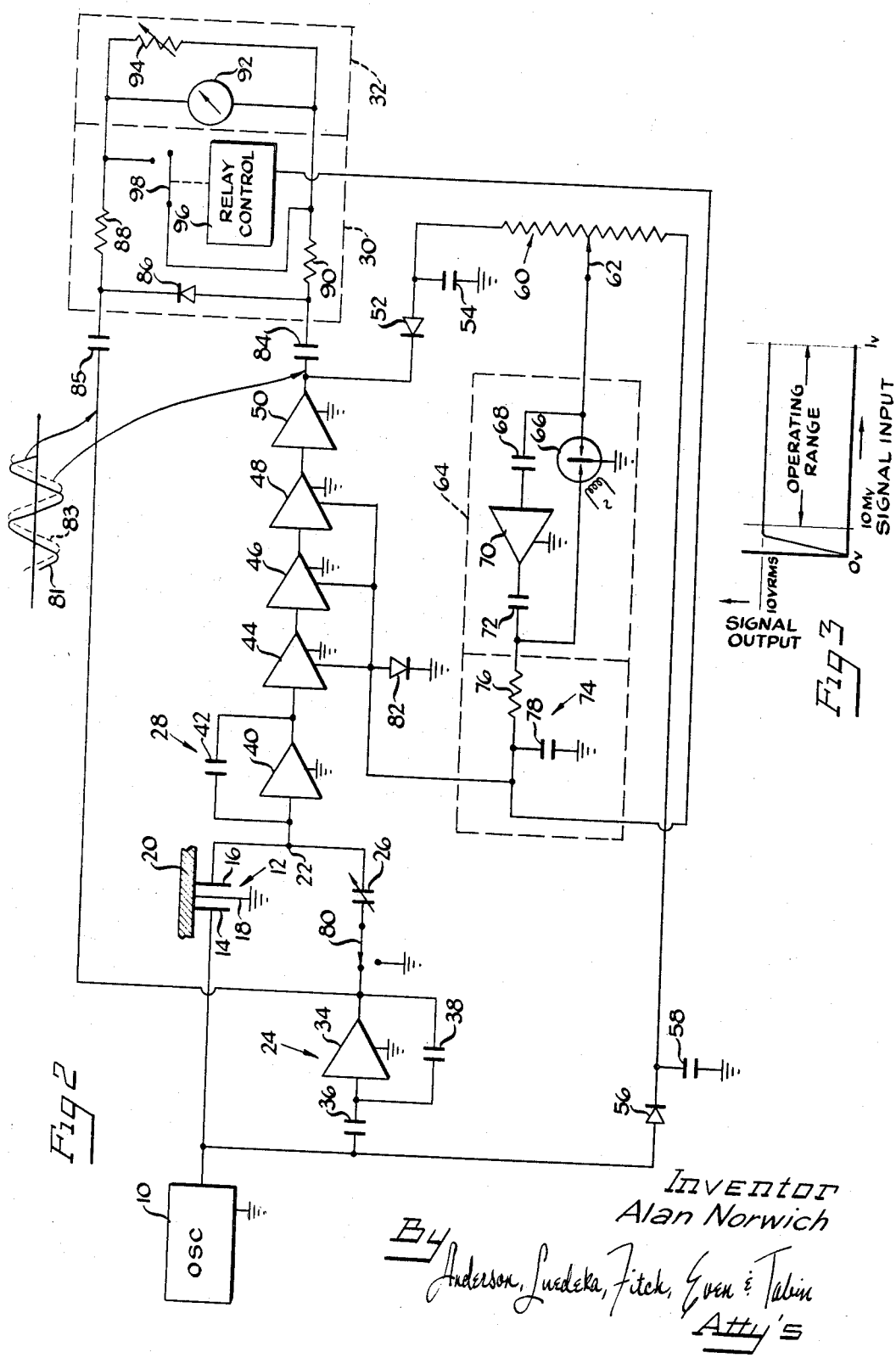

3,408,566
PHASE SHIFT METHOD AND APPARATUS FOR MASS-INDEPENDENT MEASUREMENT OF THE PROPERTIES OF DIELECTRIC MATERIALS
Alan Norwich, Columbus, Ohio, assignor to Industrial Nucleonics Corporation, a corporation of Ohio
Filed Mar. 17, 1964, Ser. No. 352,482
13 Claims. (Cl. 324—61)

ABSTRACT OF THE DISCLOSURE

Specifically described and illustrated herein is a method and apparatus for measuring the moisture content of a continuously moving sheet of paper having a variable mass per unit area in addition to a variable moisture content. The paper is passed adjacent to a capacitive probe having spaced electrode energized with a radiofrequency voltage, and a signal from the probe is detected. The portion of the signal which is due to the effect of the capacitance of the probe in the absence of the material is balanced out. The phase shift of the remaining portion of the detected signal is measured with respect to the phase of the voltage applied to the probe, independently of the amplitudes of the detected signal and the applied voltage. The resultant output signal indicates the percentage moisture content of the paper and is independent of the mass of the paper and the mass variations.

---

This invention relates generally to a system for measuring the phase shift of a signal applied to a capacitance probe to provide a determination of a property of a dielectric material. This invention is particularly directed to a system for measuring the moisture in a continuous product. It is more particularly directed to a single frequency moisture gauge wherein the phase shift occasioned by the dielectric material being measured is utilized as an indication of its relative moisture content.

It has been previously known to measure the moisture of a dielectric material by utilizing the material as the dielectric of a capacitance probe and measuring the effect of the moisture upon the dielectric constant of the material. Since the mass of the material as well as its moisture content affected the measurement, a single measurement as made in the prior art is not a true measure of moisture content, if the mass is permitted to vary. Consequently, in the prior art, it was necessary to keep the mass constant or to make a second measurement. For example, it was known to make measurements at two different frequencies and to combine the measurements in such manner as to provide a measurement of moisture independent of variations in mass. Such two frequency measurements required two signal sources at different frequencies and required a computer to combine the two measurements properly.

In accordance with the present invention, a single measurement at a single frequency is used to measure moisture content. It has been discovered that when the dielectric material to be measured is placed in a capacitance probe and the effect of the empty probe is eliminated, the phase shift of an applied signal as produced by the material is independent of variations in the mass of the material and is a measure of relative moisture content independent of the mass.

Accordingly, it is the primary object of the present invention to provide a new and improved system for measuring a property of a dielectric material independently of variations of its mass.

A further object of the invention is to provide an improved single frequency measurement system for determining the moisture content of a material independently of variations of its mass.

Still another object of the invention is to provide a single frequency measurement system wherein the phase shift occasioned by the presence of dielectric material in a capacitance probe is utilized as a measure of relative moisture content independent of the mass of the material.

Further objects and features of the present invention will become apparent from the following detailed description particularly when taken in conjunction with the accompanying drawings in which:

FIGURE 1 is a diagrammatic illustration of a general form of the measuring system of the present invention;

FIGURE 2 is a diagrammatic illustration of a preferred form of the invention illustrated in FIGURE 1, showing a preferred automatic gain control and a preferred phase shift detector;

FIGURE 3 is an illustration of the characteristic of a typical automatic gain control as used in the apparatus shown in FIGURE 2; and FIGURE 4 is a diagrammatic illustration of a modified form of the invention illustrated in FIGURE 1, showing clipping circuits for normalizing the signals being compared.

In FIGURE 1 there is illustrated a simplified form of a system utilizing the present invention. As shown in FIGURE 1, an oscillator 10 operates as a source of an alternating electrical signal. The frequency of the signal is chosen for the particular measurement to be made; however, from about 10 kilocycles to about 500 kilocycles has been found most useful. Higher frequencies may be useful for high moisture content. The input signals are applied to a capacitance probe 12 which, as shown, is preferably a fringe field capacitor comprised of electrodes 14 and 16 with a grounded guard electrode 18 therebetween. The material 20 to be measured is placed adjacent the probe to form a part of the dielectric of the capacitance probe 12. Preferably, the material is placed in electrical contact with the probe electrodes. The source 10 is coupled to electrode 14. Electrode 16 is connected to a bridge output terminal 22. At the same time, the signal from the oscillator 10 is applied through a phase inverter 24 and thence through a balancing capacitor 26 to the output terminal 22. The signals thereupon developed on the output terminal 22 are then detected by a detector circuit 28 which develops an output signal which is applied to a phase detector 30. At the same time, a phase reference signal is applied from the oscillator 10 to the phase detector 30. The phase detector 30 compares the phase of the output signal from the detector circuit 28 with the phase of the signal coming from the oscillator 10 and produces a signal indicative of the phase difference. This signal is then applied to a read-out device 32 which may be calibrated to read moisture directly.

The balancing capacitor 26 is adjusted so that the phase inverted signal through the capacitor 26 just balances the direct signal through the probe 12 in the absence of material at the probe. This balances out from the output signal the effect of the no load capacitance of the probe, i.e., the capacitance of the probe in the absence of material. Under such circumstances, when material is placed in the probe, the phase of the signal developed on the bridge output terminal 22 is shifted from the phase of the input signal from oscillator 10 by an amount related to the relative moisture content of the material and substantially independently of the mass of the material. This is because the shift in phase is occasioned by a time delay dependent upon the mathematical multiplication product of the equivalent resistance and equivalent capacitance added by the introduction of material to the probe. When the relative moisture content changes, the product of the resistance and capacitance changes, but when the mass changes, the resistance and capacitance change in opposite directions, in amounts and that the product is substantially unchanged. For example, doubling the material at the probe will cut the resistance substantially in half while substantially doubling the added capacitance.

A better insight into the theory of measurement according to the invention may be obtained by viewing the probe 12 as an admittance, and considering the net current flowing into the junction point 22. With no material 20 at the probe, this net current is zero, because the current through the probe is balanced out by an equal and opposite current fed to the junction through balancing capacitor 26. With the material at the probe, there is a net current into the junction, which current is proportional to the admittance of the material per se as seen through its interaction with the probe. This net current has two components. One current component flows through the "resistance" of the material, and is in phase with the voltage across the probe 12 per se. The other current component, or quadrature component, flows through the "capacitance" of the material, and leads the voltage across the probe by 90°.

The phase of the total net current into junction point 22 depends on the relative amplitudes of the in-phase and quadrature components. The presence of a hypothetical perfectly dry insulating material at the probe would result in a substantial quadrature current component, leading the voltage across the probe by 90°. However, the amplitude of the in-phase current component would be substantially zero because of the extremely high resistance of the material. The phase of the total current, with respect to the voltage across the probe, would thus approach 90°, since the total current would be almost entirely due to the quadrature component associated with the "capacitance" of the material.

The substitution of a very wet material for the perfectly dry material produces a substantial increase in the quadrature current component, because of the relatively high dielectric constant of water as compared to that of dry paper, for example. However, due to its much lower resistance the wet material also produces an increase in the in-phase current component, and this increase is much greater than the increase in the quadrature current component. At a very high moisture content, in fact the main contributor to the total current is the in-phase component, so that the phase of the total current, with respect to the voltage across the probe, approaches 0°.

For intermediate values of percent moisture content, the phase of the total net current into the junction is somewhere between 0° and 90°, depending on the relative amplitudes of the in-phase and quadrature current components.

The effect of changes in the mass of the material can best be considered by assuming a situation where the moisture content of the material remains constant but the mass varies. When the mass increases, the "resistance" of the material decreases for about the same reason that a large conductor has less resistance than a small conductor. Consequently, the in-phase current increases in proportion to the increase in mass. At the same time, when the mass increases, the "capacitance" of the material increases, since there are more atoms, molecules and other dipole-forming structures of the material present to be polarized by the electric field between the electrodes of the probe. The increase in capacitance causes the quadrature current component to increase, also in proportion to the increase in mass. Since the in-phase and quadrature current components both increase by the same multiplication factor, the phase of the total current with respect to the applied voltage remains substantially unchanged.

The manner in which a phase shift is produced at junction point 22 depends on the nature of the impedance presented by the detector circuit 28. If the detector circuit is designed so that it appears as a resistive load on the probe circuit, the phase shift of the voltage at junction point 22 with respect to the oscillator voltage approaches 90° with a hypothetical perfectly dry material at the probe, whereas the phase shift approaches 0° with a very wet material thereat.

However, if the detector circuit 28 is designed as shown in the two embodiments of FIGS. 2 and 4 described below, the opposite situation prevails. In this case the detector circuit presents an almost purely capacitive load to the probe circuit. With a hypothetical perfectly dry material at the probe acting substantially as a capacitance in series with the detector load capacitance, the circuit behaves as a capacitance voltage divider, with no phase shift at the junction point 22. With a wet material at the probe acting substantially as a resistance in series with the detector load capacitance, a phase shift approaching 90° is obtained at the junction point 22.

After passing through the detector circuit 28, the signal is compared by the phase detector 30 with the signal from oscillator 10. The reference signal from oscillator 10 may be as shown by waveform 27. The output signal from detector 28 may be as shown by waveform 29 at the same frequency but shifted in phase by an amount dependent upon the relative moisture content of the material 20. The phase detector 30 should be independent of the amplitude of the signals being compared. This may be achieved by clipping the signals to a uniform constant amplitude or by maintaining the amplitudes of the signals constant irrespective of changes in the material at the probe.

The system is particularly suitable for continuous measurement of material continuously moving by the probe, as paper as it is being made on a papermaking machine. The measurement may thus be used to monitor a continuous process and provide an error signal that can be used to correct the process and provide a uniform product. For example, in papermaking, the signal may be used to control steam pressure in the dryer rolls and thus control the dryness of the finished paper.

A more detailed illustration of the invention is shown in FIGURE 2, which shows the preferred form of the invention. The oscillator 10 may be conventional. As noted above, it typically provides an input signal to the measuring bridge at a frequency of 10 kilocycles to 500 kilocycles. The voltage level is typically about 10 volts RMS. The phase inverter 24 is preferably a feedback amplifier comprising an amplifier 34 with an input impedance 36 and a feedback impedance 38. The phase inverter 24 functions to provide an input signal to one side of the bridge that is substantially 180° out of phase with the input signal supplied directly by the oscillator 10. In order that the phase inverter provide substantially exactly 180° phase shift, the input impedance 36 and the feedback impedance 38 are made like. Although the magnitude of these impedances may be different, their ratio should be real. As shown, they are preferably capacitors. The signal from the oscillator 10 is thus applied through the probe 12 to the bridge output terminal 22, and the phase inverted signal is applied through balancing capacitor 26 to this same bridge output terminal 22.

In order that an apreciable phase shift be developed by the probe, the detector circuit has a low input impedance. It would be possible to operate into a low resistance or high capacitance circuit, if there were sufficient gain in the circuit without the introduction of phase shift. However, as shown, the detector circuit 28 preferably comprises a feedback amplifier having an amplifier 40 and a feedback capacitor 42. The system is first balanced with no material at the probe by adjusting the balancing capacitor 26. If the phase inverter provides unity gain, the balancing capacitor is made equal to the capacitance of the empty probe. The detector amplifier 28 acts as an A.C. summing amplifier. Inasmuch as the signal applied to the balancing capacitor 26 is 180° out of phase with the signal applied to the measuring probe 12, the detector amplifier effectively subtracts the two signals. If the bridge is balanced with no material at the probe and material is thereafter introduced into the probe, the unbalance of the bridge produces a signal detected by the detector amplifier. It is the phase of this signal that is indicative of relative moisture content of the material and independent of mass.

Comparison of the phase of the output signal with the phase of the signal applied from the oscillator 10 thus provides a measure of relative moisture content. However, in order that the comparison provide a signal that is independent of mass, it is necessary for certain phase detectors that the magnitude of the output signal be normalized, i.e., made the same irrespective of the material at the probe over the effective range of measurement. As shown in FIGURE 2, this may be achieved by automatic gain control. The detection signal from the amplifier 40 is applied through one or more amplifier stages, the gain of which is automatically controlled. In the preferred form of the invention, three amplifier stages 44, 46 and 48 are used in order that the gain of each stage may be relatively small and introduce substantially no distortion or phase shift other than the inherent 180° phase shift. Each of these stages may comprise conventional remote cut off amplifiers, preferably having plate load resistors of relatively low resistance. Because of the low signal level used to keep the distortion small, the output of the gain control amplifier stages is amplified by another amplifier stage 50 having no automatic gain control. If desirable, the amplifier stage 50 may include a cathode follower to avoid loading the gauge circuitry by the phase detector. The output of this amplifier is then applied to the phase shift detector 30, where it is compared with the phase of the oscillator output. This comparison may be directly with the oscillator output or, as shown, with the output of the phase inverter, which is 180° out of phase with the oscillator output. The choice depends upon the particular phase detector used and upon the number of 180° phase shifts introduced by the various amplifier stages.

The automatic gain control signal is provided by comparing the magnitude of the output of the amplifier 50 with a standard reference, preferably, as shown, with the oscillator output, for then the operation of the system is independent of variations in the magnitude of the oscillator output. The signal from the amplifier 50 is applied through a rectifier 52 to a capacitor 54. Similarly, the reference voltage from oscillator 10 is applied through a rectifier 56 to a capacitor 58. The rectifiers 52 and 56 are poled so that the voltage on capacitor 54 is negative and the voltage on capacitor 58 positive. One side of each of capacitors 54 and 58 is grounded while the other sides are connected together through a potentiometer 60 having a movable tap 62. The voltage picked off by the tap 62 is amplified by a D.C. amplifier 64 and applied to the control grids of the amplifier stages 44, 46 and 48 to control the gain of these stages. As shown, the D.C. amplifier may comprise a conventional 60 cycle chopper 66 operating to chop the D.C. voltage on tap 62 to derive a corresponding D.C. signal. This A.C. signal is applied through a capacitor 68 to a conventional A.C. amplifier 70 which amplifies the signal and applies it through a capacitor 72 to a smoothing or filter circuit 74 comprising a resistor 76 and a capacitor 78. Thus, the filter circuit develops a D.C. signal corresponding to the D.C. signal on tap 62 but very much amplified.

In operation, the tap 62 is first adjusted with no phase shift at the probe 12. No phase shift may be achieved by applying a sample material in the probe that is completely dry, or it may be achieved by removing both the material and the balancing capacitor. The latter may be removed by opening a switch 80 interposed between the phase inverter 24 and the balancing capacitor 26. The tap 62 is then adjusted until the read-out device 32 registers zero. With the tap in this position, the automatic gain control operates to maintain the output signal from amplifier 50 at the same level as the output of oscillator 10. Any change in the signal from the bridge circuit produces a corresponding change in the voltage derived upon capacitor 54 and hence a corresponding change in the error voltage derived on tap 62. This error voltage is amplified and applied to the gain control stages to keep the output of amplifier 50 at the same magnitude as the output of oscillator 10. A diode 82 is connected between capacitor 78 and ground and poled as to prevent the gain control voltage from ever becoming positive.

As shown, the impedances 36 and 38 are preferably capacitors of the same capacitance, and the voltage output of the phase inverter thus has the same magnitude as the output of oscillator 10, typically 10 volts RMS. Because of the automatic gain control, the output of amplifier 50 is likewise typically 10 volts RMS. With the switch 80 closed and material at the probe 12, the signal appearing at the output of amplifier 50, although equal in magnitude to the output of the phase inverter 24, is shifted in phase by an amount related to the relative moisture content of the material 20 but independent of its mass. These two signals are applied simultaneously to the phase shift detector 30 through capacitors 84 and 85. A cathode follower may be used to couple the reference signal to the phase shift detector.

The phase shift detector is preferably in the form as shown in FIGURE 2, and preferably comprises a detector-rectifier 86 connected between the capacitors 84 and 85. The detecor-rectifier 86 operates to compare the phase of the signals applied to its two sides by conducting current whenever the signal from the phase inverter is positive relative to the signal from the amplifier 50, and developing a voltage thereacross whenever the signal from the phase inverter is negative relative to the signal from the amplifier 50. The reference signal may have the form of waveform 81. The output signal may have the form of waveform 83. The amplitude of the output signal is the same as that of the reference signal, but its phase is shifted by an amount determined by the relative moisture content of the material 20. Since both signals have the same magnitude, the average voltage developed across the detetcor-rectifier 86 is solely a matter of the relative phase. The average voltage developed across the detector-rectifier 86 is measured by a meter 92 which thus registers the relative phase of the two signals. The meter 92 is coupled to the detector-rectifier 86 through resistors 88 and 90. A span adjusting resistor 94 may be placed across the meter to control its sensitivity. It may be used to calibrate the meter.

The meter may be calibarated empirically by placing samples of known moisture content in the probe and noting the reading on the meter. The meter may be calibrated to read directly in percent moisture. The meter may include a linearizing circuit so that meter deflection is a linear function of percent moisture. The meter may be separately calibrated for different types of material.

The automatic gain control circuit should make the output signal from the amplifier 50 have substantially the same magnitude over a wide range of materials. The characteristic of the gain control circuit may typically be as shown in FIGURE 3, where the characteristic is shown as substantially flat for signal inputs from the detector amplifier in the range 10 millivolts to 1 volt. The output signal from amplifier 50 is typically 10 volts RMS over this entire range. The components are selected so that the material intended to be measured falls within this range. For measuring thinner material, it is necessary to modify the components to provide a lower operating range.

It may sometimes happen that material comes to the probe that is too thin to be accurately measured by the system. This is because when there is insufficient mass, the gain control characteristic is such that the gain control is unable to supply the required normalized signal. When this occurs, the error voltage on tap 62 may go positive, trying to increase the gain of the gain control stages. Under these conditions, the gain would no longer be controlled and the measurement would be inaccurate. A relay may be utilized to note this false reading. As shown, a relay control circuit 96, which includes a relay winding, is connected to the output of the D.C. amplifier 64. When the output drops to zero, the relay winding closes a relay 98. As noted above, the diode 82 prevents the control voltage from going positive and thus clamps the control voltage at zero when it tends to go positive. Thus, whenever the error voltage is in such condition as to be unable to control the gain control stages, the relay 98 operated by the relay control 96 is closed. This relay 98 may be used to indicate on the meter 92 that a condition of no measurement exists. It may do so by short-circuiting the meter.

In FIGURE 4 is shown an alternative form of the invention utilizing clipping circuits rather than an automatic gain control to normalize the signals. In this case, the output of the detector amplifier 40 is further amplified by an amplifier 100, and then clipped by a clipping circuit 101. The clipping circuit may be a conventional diode clipper. The effect of amplifier 100 and clipping circuit 101 is to convert the signal to a square wave. The waveform of the signal from the amplifier 40 may be substantially sinusoidal with a phase depending upon the moisture of material 20. The output of the clipper 101 will be a square wave substantially exactly 180° out of phase with the signal from the amplifier 40. The wave shape for the signal from the amplifier 40 may be as shown by waveform 102, while the clipped waveform may be as shown by waveform 104. Similarly, the reference signal may be derived from the oscillator 10 or from the phase inverter 24, as shown, and similarly amplified by amplifier 106 and clipped by clipping circuit 108 to provide a square wave reference signal as indicated by waveform 110. The two clipped signals may then be applied to the phase shift detector 30. The voltage developed on the diode 86 is a measure of the phase difference and thus a measure of the relative moisture content of the material 20.

Although certain specific embodiments have been described herein, modifications may be made hereto without departing from the true spirit and scope of the invention as set forth in the appended claims.

For example, it should be noted that although the probe has been called a capacitance probe, the dielectric constant of the material being measured has an imaginary, i.e., resistive component and preferably the probe electrodes are not insulated from the material being measured, but on the contrary are in contact therewith. It should be noted particularly that although a specific example of a phase detector has been shown and described, other phase detectors may be used to measure the change in phase occasioned by the material in the probe. It should also be noted that although phase inverter 24 has been used to apply a signal of inverted phase to the balancing capacitor, the connections could be the other way around and the oscillator 10 connected directly to the balancing capacitor with the phase inverter connected to the probe. It should be further noted that it is intended that wide band amplifiers be utilized so that there is substantially no phase shift introduced by the components of the system over a wide range of frequencies, except for the inherent 180° phase shift introduced by the amplifiers. Thus, the same system may be used at different frequencies for different ranges of moisture. The wide band amplifiers for the phase inverter and the summing amplifier may be of the sort described in the copending application Ser. No. 317,533 filed Oct. 21, 1963, by Ko-Hsin Liu, and now U.S. Patent No. 3,323,048 for a Moisture Measuring System. Should the system introduce phase shift that would otherwise make the measurement incorrect, a phase shift network such as a conventional R.C. network may be interposed to adjust the phase at the measuring frequency.

In addition to measuring relative moisture content, this invention is suited for the measurement of other properties such as the ratio of materials in a mixture. For some measurements, as when liquids are involved, a parallel plate probe may be more suitable than the fringe field probe described above.

What is claimed is:
1. A method for the quantitative determination of a property of a dielectric material independent of its mass, said method comprising applying an alternating current electrical signal to at least a portion of the material, deriving an output alternating signal resulting from the applied signal as this applied signal is influenced by the mass of said material and the dielectric properties of said material, and comparing the phase of said output signal with the phase of said applied signal independently of the magnitudes of said output and applied signals to produce a resultant signal indicative of the difference in phase occasioned by said material and hence indicative of said property independently of the mass of said material.

2. A method for the quantitative determination of a property of a dielectric material independent of its mass, said method comprising applying an alternating current electrical signal to a pair of spaced electrodes, coupling said electrodes to at least a portion of the material, deriving an output alternating signal resulting from the applied signal as this applied signal is influenced by the mass of said material and the dielectric properties of said material while at the same time balancing out from said output signal any effect of the capacitance between said electrodes in the absence of said material, and comparing the phase of said output signal with the phase of said applied signal independently of the magnitudes of said output and applied signals to produce a resultant signal indicative of the difference in phase occasioned by said material and hence indicative of said property independently of the mass of said material.

3. A method for the quantitative determination of a property of a dielectric material said method comprising applying an alternating current electrical signal to a pair of spaced electrodes, coupling said electrodes to at least a portion of the material, deriving an output alternating signal resulting from the applied signal as this applied signal is influenced by the dielectric properties of said material while at the same time balancing out from said output signal any effect of the capacitance between said electrodes in the absence of said material, normalizing said output signal to make its magnitude substantially independent of the material at said probe over the effective range of measurement, and comparing the phase of said output signal thus normalized with the phase of said applied signal to produce a resultant signal indicative of the difference in phase occasioned by said material and hence indicative of said property.

4. Apparatus for quantitative determination of a property of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion, said detecting means including means for deriving an output electrical signal resulting from the signal applied to said portion from said source as this applied signal is influenced by the mass of said material and the dielectric properties of said material, and means for comparing the phase of said output signal with the phase of said applied signal independently of the magnitudes of said output and applied signals to produce a resultant signal indicative of the phase shift occasioned by said material, thereby indicating said property independently of the mass of said material.

5. Apparatus for quantitative determination of a property of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion, said detecting means including means for deriving an output electrical signal resulting from a signal applied to said portion from said source as this applied signal is influenced by the mass of said material and the dielectric properties of said material, and means for comparing the phase of said output signal with the phase of said applied signal independently of the magnitudes of said output and applied signals to produce a resultant signal indicative of the phase shift occasioned by said material, thereby indicating said property independently of the mass of said material, said apparatus further including balancing capacitance means connected in circuit with said probe means to balance out from said output signal any component developed by said probe means itself without said material.

6. Apparatus for quantitative determination of a property of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion, said detecting means including means for deriving an output electrical signal resulting from the signal applied to said portion from said source as this applied signal is influenced by the mass of said material and the dielectric properties of said material, and means for comparing the phase of said output signal with the phase of said applied signal independently of the magnitudes of said output and applied signals to produce a resultant signal indicative of the phase shift occasioned by said material, thereby indicating said property independently of the mass of said material, said apparatus further including balancing capacitance means coupled to said detecting means for balancing out from said output signal the effect of the capacitance of said probe means in absence of said material.

7. Apparatus for quantitative determination of a property of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion, said detecting means including means for deriving an output electrical signal resulting from the signal applied to said portion from said source as this applied signal is influenced by the mass of said material and the dielectric properties of said material, means for normalizing said output signal to make its magnitude substantially independent of the material at said probe over the effective range of measurement, and means for comparing the phase of said output signal thus normalized with the phase of said applied signal to produce a resultant signal indicative of the phase shift occasioned by said material, thereby indicating said property independently of the mass of said material, said apparatus further including balancing capacitance means coupled to said detecting means for balancing out from said output signal the effect of the capacitance of said probe means in absence of said material.

8. Apparatus for quantitative determination of a property of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion, said detecting means including means for deriving an output electrical signal resulting from the signal applied to said portion from said source as this applied signal is influenced by the dielectric properties of said material, an automatic gain control circuit for normalizing said output signal to make its amplitude substantially independent of the material at said probe over the effective range of measurement, and means for comparing the phase of said output signal thus normalized with the phase of said applied signal to produce a resultant signal indicative of the phase shift occasioned by said material, thereby indicating said property, said apparatus further including balancing capacitance means coupled to said detecting means for balancing out from said output signal the effect of the capacitance of said probe means in absence of said material.

9. Apparatus for quantitative determination of the relative moisture content of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion, said detecting means including means for deriving an output electrical signal resulting from the signal applied to said portion from said source as this applied signal is influenced by the mass of said material and the dielectric properties of said material, an automatic gain control circuit coupled to said source for normalizing said output signal to make its amplitude substantially independent of the material at said probe over the effective range of measurement, and means for comparing the phase of said output signal thus normalized with the phase of said applied signal to produce a resultant signal indicative of the phase shift occasioned by said material, thereby indicating said relative moisture content independently of the mass of said material, said apparatus further including balancing capacitance means coupled to said detecting means for balancing out from said output signal the effect of the capacitance of said probe means in absence of the material.

10. Apparatus for quantitative determination of the relative moisture content of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion, said detecting means including means for deriving an output electrical signal resulting from the signal applied to said portion from said source as this applied signal is influenced by the mass of said material and the dielectric properties of said material, and means for comparing the phase of said output signal with the phase of said applied signal to produce a resultant signal indicative of the phase shift occasioned by said material, thereby indicating said relative moisture content independently of the mass of said material, said means for comparing including a rectifier with one side coupled to receive a reference signal corresponding in phase with said applied signal and with its other side coupled to receive said output signal, means for normalizing said output signal to make its amplitude substantially the same as that of said reference signal, and means for measuring the voltage developed across said rectifier as indicative of the difference in phase between said output signal and said applied signal.

11. Apparatus for quantitative determination of a property of a dielectric material, said apparatus comprising a source of a first alternating current electrical signal, capacitance probe means coupled to said source and having spaced electrodes arranged for applying said electrical signal from said source to at least a portion of said material, phase inverting means coupled to said source for producing a second alternating current electrical signal substantially 180° out of phase with said first alternating current, a balancing capacitance means coupled to said phase inverting means, detecting means including a summing amplifier coupled to said capacitance probe means and said balancing capacitance means for deriving an output electrical signal resulting from the combination of the signal from said balancing capacitance means with the signal applied to said portion from said source as this applied signal is influenced by the mass of said material and the dielectric properties of said material, said balancing capacitance means producing a signal to make said output signal substantially zero in the absence of material at said probe means, and means for comparing the phase of said output signal with the phase of said applied signal independently of the magnitudes of said output and applied signals to produce a resultant signal indicative of the phase shift occasioned by said material, thereby indicating said property independently of the mass of said material.

12. Apparatus for quantitative determination of a property of a dielectric material, said apparatus comprising a source of a first alternating current electrical signal, capacitance probe means coupled to said source and having spaced electrodes arranged for applying said electrical signal from said source to at least a portion of said material, phase inverting means coupled to said source for producing a second alternating current electrical signal substantially 180° out of phase with said first alternating current, a balancing capacitance means coupled to said phase inverting means, detecting means including a summing amplifier coupled to said capacitance probe means and said balancing capacitance means for deriving an output electrical signal resulting from the combination of the signal from said balancing capacitance means with the signal applied to said portion from said source as this applied signal is influenced by the mass of said material and the dielectric properties of said material, said balancing capacitance means producing a signal to make said output signal substantially zero in the absence of material at said probe means, means for normalizing said output signal to make its magnitude substantially independent of the material at said probe over the effective range of measurement, and means for comparing the phase of said output signal thus normalized with the phase of said applied signal to produce a resultant signal indicative of the phase shift occasioned by said material, thereby indicating said property independently of the mass of said material.

13. Apparatus for quantitative determination of a property of a dielectric material, said apparatus comprising a source of an alternating current electrical signal, detecting means, and capacitance probe means coupled to said source and having spaced electrodes arranged for applying said electrical signal from said source to at least a portion of said material and coupling said detecting means to said portion,
said detecting means including
means for deriving an output electrical signal resulting from the signal applied to said portion from said source as this applied signal is influenced by the mass of said material and the dielectric properties of said material,
an automatic gain control circuit coupled to said source for normalizing said output signal to make its amplitude substantially independent of the material at said probe over the effective range of measurement,
and means for comparing the phase of said output signal thus normalized with the phase of said applied signal to produce a resultant signal indicative of the phase shift occasioned by said material, thereby indicating said property independently of the mass of said material,
said means for comparing including
a rectifier with one side capacitively coupled to receive a reference signal corresponding in phase to said applied signal and with its other side capacitively coupled to receive said output signal thus normalized,
and means for measuring the voltage developed across said rectifier,
said gain control circuit making the amplitude of said output signal substantially equal to that of said reference signal,
said apparatus further including balancing capacitance means coupled to said detecting means for balancing out from said output signal the effect of the capacitance of said probe means in absence of said material.

References Cited
UNITED STATES PATENTS

| | | | |
|---|---|---|---|
| 2,446,527 | 8/1948 | Chun et al. | 324—89 XR |
| 2,535,026 | 12/1950 | Anderson | 324—61 |
| 2,630,008 | 3/1953 | Howe et al. | 324—65 XR |
| 2,718,620 | 9/1955 | Howe | 324—61 |
| 2,719,262 | 9/1955 | Bousman | 324—57 |
| 3,249,833 | 5/1966 | Vosteen | 324—61 X |
| 3,290,588 | 12/1966 | Norwich | 324—61 |

FOREIGN PATENTS

| | | |
|---|---|---|
| 58,255 | 11/1953 | France. |
| 938,623 | 2/1956 | Germany. |

OTHER REFERENCES

Schwirzer, German printed application No. 1,081,677, published May 1960.

RUDOLPH V. ROLINEC, *Primary Examiner.*

E. E. KUBASIEWICZ, *Assistant Examiner.*